United States Patent Office 3,427,199
Patented Feb. 11, 1969

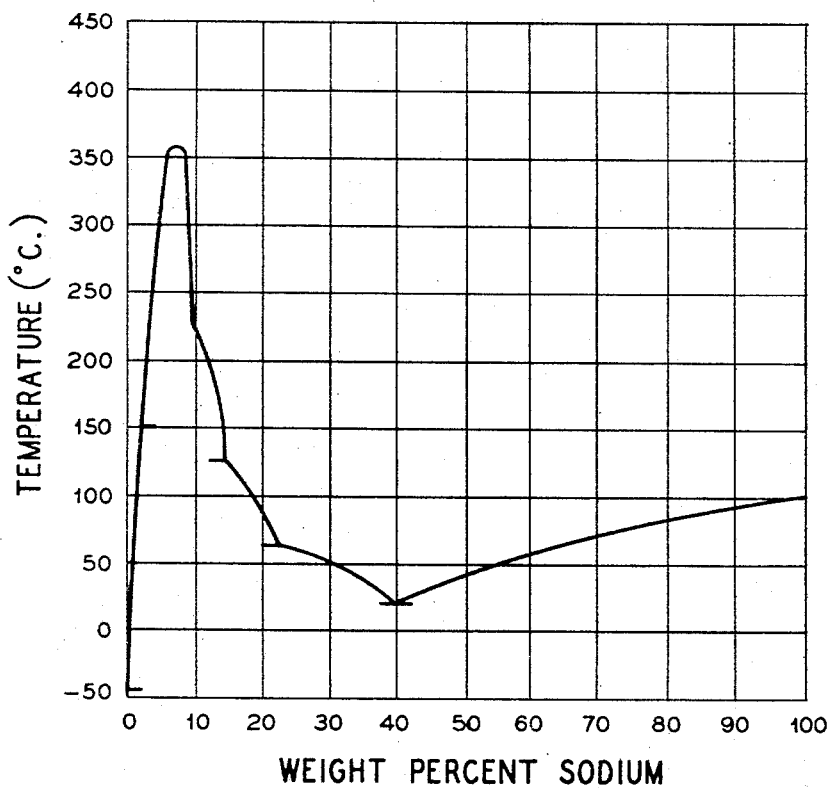

---

3,427,199
METHOD FOR STARTING OPERATION OF A SODIUM AMALGAM-OXIDANT FUEL CELL
Erwin A. Schumacher, Cleveland, and Milton B. Clark, North Royalton, Ohio, assignors to Union Carbide Corporation, a corporation of New York
Filed Dec. 23, 1963, Ser. No. 332,701
U.S. Cl. 136—86                 3 Claims
Int. Cl. H01m 27/30

The invention relates to a method for starting operation of a sodium amalgam-oxidant fuel cell at room temperatures, and particularly refers to a method which substantially eliminates the need for an auxiliary supply of heat and electrical energy during the starting period.

The construction of a sodium amalgam-oxidant fuel cell is similar to the construction of a hydrogen-oxygen cell. Both comprise an anode, a cathode, and an electrolyte between the two, and the cathode in both is usually a porous conductive body repellent to electrolyte but permeable to a gaseous oxidant. In a sodium amalgam-oxidant fuel cell, however, the anode is usually a flat, vertical, conductive plate instead of the ordinary porous conductive body used in conjunction with anodic hydrogen gas.

This change in construction is necessary because the sodium amalgam, which contains sodium as the anodic material, is a liquid rather than a gas. During cell operation, the sodium amalgam is usually introduced at the top of the anode plate, permitted to flow down the face of the plate to present the dissolved sodium as a usable surface, and then removed as depleted amalgam from the bottom of the cell. The depleted amalgam is then enriched with solid or liquid sodium in suitable regenerators and recirculated through the cell.

In addition to the necessary changes in anode construction, the liquid sodium amalgam also presents other unusual problems in the operation and maintenance of the fuel cell and its auxiliary equipment for continuous operation. One such problem concerns a means of starting operation of the fuel cell without undue auxiliary equipment for supplying heat and electrical energy to the system before the fuel cell itself supplies enough to satisfy its own needs.

This problem is aggravated by the fact that at room temperatures the concentration of the sodium in the sodium amalgam must be less than about 0.65 percent by weight to prevent solidification of the amalgam. Furthermore, in many instances due to a requirement of minimum weight or space, a large quantity of sodium amalgam containing 0.65 percent sodium cannot be conveniently stored for the purpose of starting operation of the cell.

The principal object of the invention, therefore, is to provide a convenient method for starting operation of a sodium amalgam-oxidant fuel cell, which method substantially eliminates the need for undue auxiliary equipment for supplying heat and electrical energy during the starting period.

Broadly, the above object is achieved by a method which comprises either supplying to the anode a sodium amalgam containing about 40 percent by weight sodium or mixing such an amalgam with a quantity of mercury containing up to about 0.5 percent by weight sodium to form an amalgam containing up to 0.65 percent by weight sodium and then supplying the latter amalgam to the anode. Usually, the outlet amalgam from the cell contains less than about 0.2% by weight sodium.

The invention will be more fully understood by reference to the drawing, wherein a sodium-mercury phase diagram is shown.

As there shown, a sodium amalgam is fluid at substantially room temperature when the concentration of the sodium is less than about 1 percent by weight and also when the concentration of the sodium is between about 35 and about 45 percent by weight. At 25° C., the concentration of the sodium must be either less than about 0.65 percent by weight or about 40 percent by weight if the amalgam is to remain fluid. At other sodium concentrations, the melting point of the amalgam may rise as high as 350° C. It will therefore be apparent that the concentration of the sodium in the amalgam must be kept within narrow ranges to keep the amalgam fluid, and if the amalgam solidifies, undesirable power supplies for heat and pumping power will be required. Those in the art will also recognize that a separate supply of sodium amalgam containing less than 0.65 percent by weight sodium, which could be used for starting battery operation at room temperature without undue need of heat and other energy, is undesirable because of the large quantities of mercury which would be present in such an amalgam.

In accordance with the invention, a relatively small supply of a sodium amalgam containing about 40 percent by weight sodium is maintained near the fuel cell and used for starting cell operation. When the cell needs to be started, this amalgam can be fed directly to the anode as a source of anodic sodium or can be mixed with the depleted amalgam previously removed from the cell, or with mercury, to form an amalgam of about 0.65 percent by weight sodium, which in turn can be fed to the anode. If an oxidant, such as oxygen, chlorine, or bromine, is fed to the cathode at the same time, the cell will produce enough power to run its own auxiliary equipment, such as pumps and the sodium amalgam regenerator. At this point, the cell and its auxiliary system can stand on its own and the supply of the 40 percent amalgam can be discontinued.

The 40 percent amalgam can be fed into the fuel cell directly, or fed into the amalgam regenerator, the amalgam piping system, a special separate device, or other places to combine with mercury or amalgam depleted of part of its sodium content, thereby bringing the sodium content of the mercury or depleted amalgam to a proper level for feeding into the fuel cell. Depending upon the ambient temperature of the cell system, the stored amalgam for starting operation of the fuel cell can contain between about 35 and about 45 percent by weight sodium, but 40 percent is preferred since the melting point is lower at this concentration. If the 40 percent amalgam described herein is stored at an elevation above the anode in the fuel cell, the cell can be started without benefit of auxiliary power except that required to operate the amalgam circulation pump.

Sodium amalgam containing between 35 and 45 percent by weight sodium, when stored in suitable containers with an oxygen and water-free atmosphere, will not deteriorate. This amalgam, however, is not suitable as an anodic material for continuous operation because of wasteful sodium corrosion and self-discharge, which have been found to be excessively high even in concentrated alkaline electrolyte.

In accordance with the method of the invention, approximately 275 pounds of sodium as a 40 percent amalgam can be stored with a total amalgam weight of about 687 pounds, which is sufficient anodic fuel to operate a 500-volt, 150-kilowatt sodium amalgam-oxygen battery plant for more than one hour at full power. For comparison, a lead acid battery capable of a similar performance in stand-by service would weigh over 4,000 pounds.

What is claimed is:
1. In a process of generating electrical energy, in a fuel cell including an anode, a cathode and aqueous electrolyte, comprising feeding an oxidant and a second liquid sodium amalgam in an amount sufficient to react with said oxidant to produce electrical energy, the improvement in combination therewith comprising starting up said fuel cell when at about room temperature, prior to introducing said second sodium amalgam, by supplying to said anode, a first liquid amalgam containing between about 35 and 45 percent by weight sodium and an oxidant to said cathode thereby generating electrical and heat energy, discontinuing said supply of said first sodium amalgam before introducing said second sodium amalgam, the energy generated during the start up period constituting the only source of power from said fuel cell during said start up period.

2. The method defined in claim 1 wherein said oxidant is gaseous oxygen and said electrolyte is an aqueous solution of sodium hydroxide.

3. The method defined in claim 1 wherein said sodium amalgam containing between about 35 and about 45 percent by weight sodium is a sodium amalgam containing about 40 percent by weight sodium.

References Cited

UNITED STATES PATENTS

| | | | |
|---|---|---|---|
| 2,618,550 | 11/1952 | Hampel et al. | 75—84.5 |
| 3,057,946 | 10/1962 | Eidensohn | 136—86 |
| 3,181,848 | 5/1965 | Miller | 136—86 |

OTHER REFERENCES

Constitution of Binary Alloys, Hansen, 2nd ed., p. 827, 1958.

WINSTON A. DOUGLAS, *Primary Examiner.*

H. FEELEY, *Assistant Examiner.*